(12) United States Patent
Kim et al.

(10) Patent No.: US 10,540,567 B2
(45) Date of Patent: Jan. 21, 2020

(54) BIN-PICKING SYSTEM AND METHOD FOR BIN-PICKING

(71) Applicant: Electronics and Telecommunications Research Institute, Daejeon (KR)

(72) Inventors: Kye-Kyung Kim, Daejeon (KR);
Sang-Seung Kang, Daejeon (KR);
Jae-Yeon Lee, Daejeon (KR);
Jae-Hong Kim, Daejeon (KR);
Joong-Bae Kim, Daejeon (KR);
Sung-Woong Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 621 days.

(21) Appl. No.: 15/079,261

(22) Filed: Mar. 24, 2016

(65) Prior Publication Data

US 2016/0284078 A1    Sep. 29, 2016

(30) Foreign Application Priority Data

Mar. 25, 2015  (KR) ......................... 10-2015-0041588

(51) Int. Cl.
*G06K 9/46*    (2006.01)

(52) U.S. Cl.
CPC .. G06K 9/4604 (2013.01); *G06T 2207/30108* (2013.01)

(58) Field of Classification Search
CPC .................................................. G06T 7/0085;
G06T 7/12; G06T 7/73; G06T 2207/30108; G06K 9/4604; G06K 9/6267
See application file for complete search history.

(56) References Cited

U.S. PATENT DOCUMENTS 6,031,933 A * 2/2000 Kumagai ............. A63B 47/008
                                                        356/426
10,149,958 B1 * 12/2018 Tran ...................... A61M 21/00
(Continued)

FOREIGN PATENT DOCUMENTS

| KR | 1020110095700 A | 8/2011 |
| KR | 1020130072063 A | 7/2013 |
| KR | 1020140044054 A | 4/2014 |

OTHER PUBLICATIONS

Kye Kyung Kim et al., "Object Recognition Method for Industrial Intelligent Robot," J. Korean Soc. Precis. Eng., Sep. 2013, pp. 901-908, vol. 30, No. 9.

*Primary Examiner* — Saul Rodriguez
*Assistant Examiner* — Ashley K Romano
(74) *Attorney, Agent, or Firm* — William Park & Associates Ltd.

(57) ABSTRACT

Disclosed are a bin-picking system and a bin-picking method. A bin-picking system includes a transformable bin-picking box; a supporting unit configured to support the bottom part of the bin-picking box and be movable upward and downward; and a control unit configured to change an alignment of at least one bin-picking candidate object by transforming the bin-picking box by controlling a movement of the supporting unit if no bin-picking target object is detected from the at least one bin-picking candidate object existing inside bin-picking box and placed on the supporting unit to facilitate detection of a bin-picking target object and bin-picking.

13 Claims, 9 Drawing Sheets

(56) References Cited

U.S. PATENT DOCUMENTS

| | | | | |
|---|---|---|---|---|
| 2005/0008213 | A1* | 1/2005 | Shankarappa | G06K 9/00 |
| | | | | 382/141 |
| 2006/0262112 | A1* | 11/2006 | Shimada | G06T 17/00 |
| | | | | 345/419 |
| 2008/0037874 | A1* | 2/2008 | Chang | G06T 7/0004 |
| | | | | 382/195 |
| 2012/0242835 | A1* | 9/2012 | Li | G08G 1/167 |
| | | | | 348/148 |
| 2013/0131853 | A1* | 5/2013 | Regan | G06T 7/74 |
| | | | | 700/114 |
| 2013/0163858 | A1 | 6/2013 | Kim et al. | |
| 2013/0279769 | A1* | 10/2013 | Benkley, III | G06K 9/00013 |
| | | | | 382/124 |
| 2014/0016841 | A1* | 1/2014 | Zahniser | G06T 7/0012 |
| | | | | 382/128 |
| 2014/0100696 | A1 | 4/2014 | Kim et al. | |
| 2015/0262352 | A1* | 9/2015 | Carrola, Jr. | G06T 7/0012 |
| | | | | 382/128 |
| 2016/0012310 | A1* | 1/2016 | Kozicki | G06F 16/9554 |
| | | | | 382/218 |
| 2017/0264843 | A1* | 9/2017 | Zhou | H04N 5/3696 |
| 2018/0032832 | A1* | 2/2018 | Shen | G06K 9/3208 |

\* cited by examiner

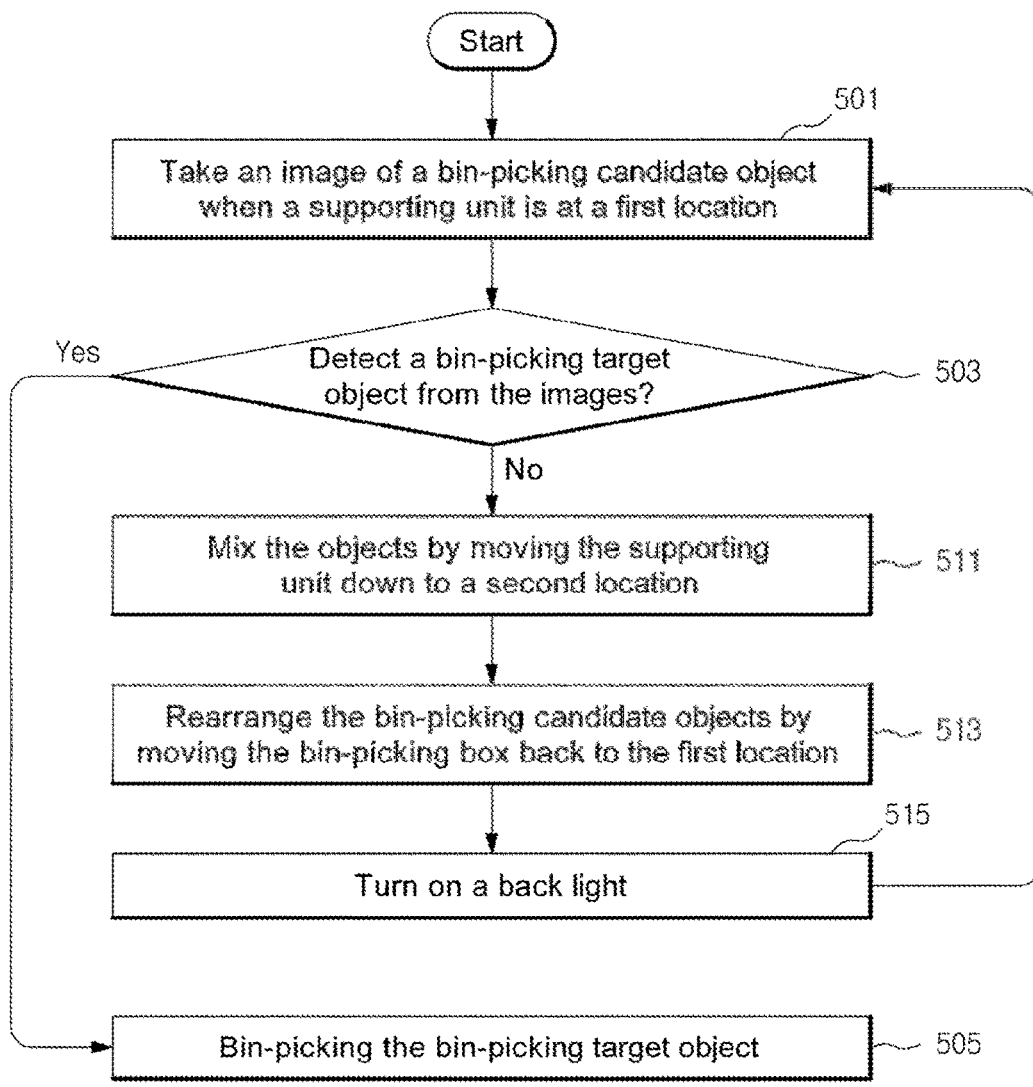

BIN-PICKING SYSTEM AND METHOD FOR BIN-PICKING

CROSS REFERENCE TO RELATED APPLICATION

This application claims the benefit under 35 USC § 119(a) of Korean Patent Application No. 10-2015-0041588 filed on Mar. 25, 2015 in the Korean Intellectual Property Office, the entire disclosure of which is incorporated herein by reference for all purposes.

BACKGROUND

1. Field

The following description relates to a bin-picking system and a bin-picking method.

2. Description of Related Art

Industrial robots have been used for the automation of manufacturing processes. For example, industrial robots have been applied for assembly and pick and place, for example, such as packaging of objects (for example, components) that are placed in a certain location to improve productivity. A cell manufacturing system has been introduced for needs of flexible production lines. Thus, a great deal of development research is currently under way on bin-picking systems to assembly and pick and place. Bin-picking allows detecting a location of a target object to be assembled or packaged from randomly stacked objects and completing assembly or packaging by repeating pick and place processes.

Typical bin-picking method estimates location and pose of objects using a 3-dimensional scanner and then picking an object which is on the top therefrom in a bin-picking box. A structured light and a stereo method using a 2D camera have being used to estimate location and pose of objects.

Since objects placed in a bin-picking box are randomly oriented and overlapped with each other, errors are commonly caused in estimating location and pose of a bin-picking target object. Specially, if the surface material of objects such as plastics has a characteristic of reflecting light, it is very difficult to identify and detect location and pose of a target object from the objects overlapped with each other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A bin-picking system according to an example may facilitate detection and identification of a bin-picking target object.

A bin-picking system according to an example may improve accuracy for estimating location and pose of a bin-picking target object.

A bin-picking system according to an example may provide smooth bin-picking of a bin-picking target object.

According to one general aspect, a bin-picking system includes a transformable bin-picking box; a supporting unit configured to support the bottom part of the bin-picking box and be movable upward and downward; and a control unit configured to change an alignment of at least one bin-picking candidate object by transforming the bin-picking box by controlling a movement of the supporting unit if no bin-picking target object is detected from the at least one bin-picking candidate object existing inside bin-picking box and placed on the supporting unit.

The bin-picking box may be formed of a flexible material.

The bin-picking box may include a back light configured to irradiate light to the bin-picking candidate objects.

A cross-sectional object region of the bin-picking box may become narrower toward the bottom end.

A cross-sectional object region of the supporting unit may be narrower than that of the top end of the bin-picking box.

The bin-picking system may further include an image acquisition unit configured to take an image of the bin-picking candidate objects, wherein the control unit may detect the bin-picking target object from the image received from the image acquisition unit.

The control unit may extract silhouette and edge information of the bin-picking candidate objects from the image received from the image acquisition unit and detect a bin-picking target object from the bin-picking candidate objects based on the extracted silhouette and edge information.

The control unit may estimate location and pose of the bin-picking target object based on the extracted silhouette and edge information.

The bin-picking system may further include a bin-picking unit configured to perform bin-picking for the bin-picking target object based on the estimated location and pose.

The control unit may move the supporting unit down from a first location to a second location and then move the supporting unit up from the second location to the first location when the bin-picking target object is not detected from the bin-picking candidate objects.

The control unit may control the image acquisition unit to take an image when the supporting unit is positioned at the first location.

The image acquisition unit may include a visual sensor configured to take photos of the bin-picking candidate objects and a front light configured to irradiate light to the bin-picking candidate objects.

The image acquisition unit may further include at least one of a polarizing filter configured to filter the light incident to the visual sensor and a diffusing panel configured to diffuse the light irradiated from the front light.

According to another general aspect, a bin-picking method includes moving a supporting unit up to a first location to place at least one bin-picking candidate object on the supporting unit, while objects are placed in a bin-picking box, the bottom of the bin-picking box being supported by the supporting unit and the bin-picking box being transformed in accordance with a vertical movement of the supporting unit; taking an image of the at least one bin-picking candidate object and detecting a bin-picking target object from the at least one bin-picking candidate object based on the image; and rearranging the bin-picking candidate objects by moving the supporting unit down to a second location and then moving the supporting unit back to the first location when the bin-picking target object is not detected.

The method may further include turning a back light, located at the bottom in the bin-picking box, on when the bin-picking target object is not detected.

The detecting a bin-picking target object may include extracting silhouette and edge information of the bin-picking candidate objects from the image and detecting a bin-picking target object based on the extracted silhouette and edge information.

The method may further include estimating location and pose of the bin-picking target object based on the extracted silhouette and edge information.

The method may further include performing bin-picking for the bin-picking target object based on the estimated location and pose.

A bin-picking system and a method according to an example may improve accuracy for estimating location and pose of a bin-picking target object.

A bin-picking system and a method according to an example may facilitate detection and identification of a bin-picking target object.

A bin-picking system and a method according to an example may be applied to the cell manufacturing process to improve productivity.

A bin-picking system and a method according to an example may be applied to the assembly or packaging process to improve productivity.

Other features and aspects will be apparent from the following detailed description, the drawings, and the claims.

BRIEF DESCRIPTION OF THE DRAWINGS

FIG. 5 is a flowchart illustrating an example of a bin-picking method.

Figure 1:
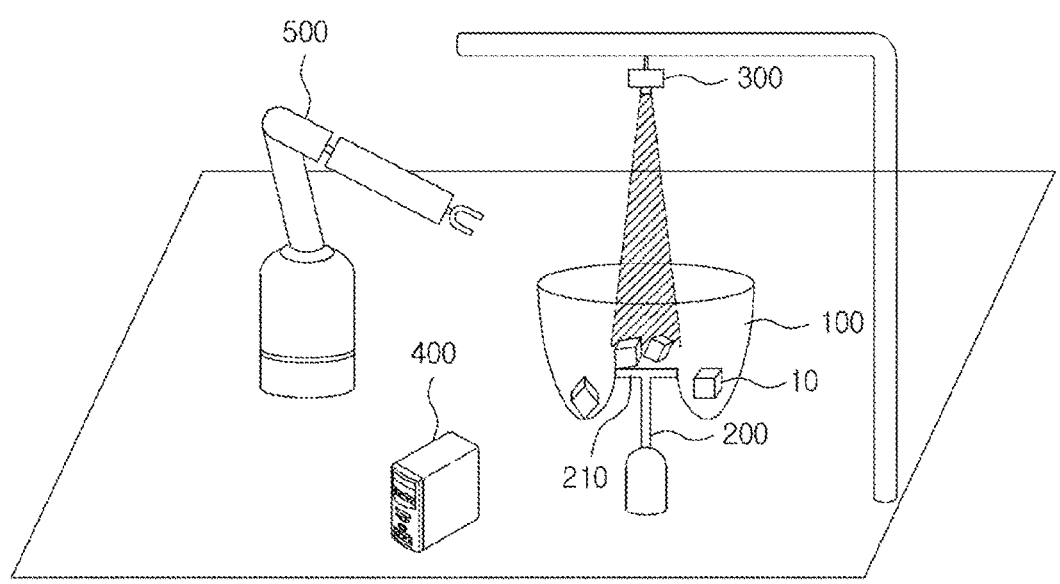
FIG. 1 is a diagram illustrating an example of a bin-picking system.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. Similarly, when it is described that a method includes series of steps, a sequence of the steps is not a sequence in which the steps should be performed in the sequence, an arbitrary technical step may be omitted and/or another arbitrary step, which is not disclosed herein, may be added to the method.

FIG. 1 is a diagram illustrating an example of a bin-picking system.

Referring to FIG. 1, a bin-picking system may include a bin-picking box 100, a supporting unit 210, an image acquisition unit 300 and a bin-picking unit 500. At least one of the elements can be omitted.

The bin-picking box 100 may hold at least one object 10. The bin-picking box 100 may be formed of an atypical flexible material, for example, such as fabric, plastic or silicone.

The bottom of the bin-picking box 100 may be supported by the supporting unit 210 and thus the bin-picking box 100 may be transformed. The meaning of that the bottom of the bin-picking box 100 is supported by the supporting unit 210 is that the bottom of the bin-picking box 100 may be pressed by the supporting unit 210. When the bin-picking box 100 is pressed by the supporting unit 210, some of the objects 10 may be located on the supporting unit 210. The meaning of that the objects 10 may be located on the supporting unit 210 is that the objects 10 are supported by the supporting unit 210 while they are still in the bin-picking box 100. The object being in the bin-picking box 100 and supported by the supporting unit 210 are called as "a bin-picking candidate object" for convenience of description.

The bin-picking candidate objects may be targets of which an image is to be taken in order to detect a bin-picking target object. The bin-picking target object may be an object to be bin-picked by the bin-picking unit 500 among the bin-picking candidate objects.

The supporting unit 210 may function as a bench for a bin-picking process and be movable upward and downward by the driving unit 200. The driving unit 200 may move the supporting unit 210 up and down under control of the control unit 400.

The supporting unit 210 may be moved up and down by the control unit 400 to transform shape of the bin-picking box 100.

The image acquisition unit 300 may take an image of bin-picking candidate objects. The image acquisition unit 300 may take an image of bin-picking candidate objects when the supporting unit 210 is located at a predetermined first position. Thus, image of the bin-picking candidate objects may be always taken at a constant distance. This may improve accuracy for estimating location and pose of the bin-picking target object.

The control unit 400 may pre-process the image received from the image acquisition unit 300 and extract features of the bin-picking candidate objects from the pre-processed image. Image pre-processing may mean generation of at least one of a binary image and an edge image from the image taken by the image acquisition unit 300. Features of the bin-picking candidate objects may include at least one of edge information and silhouette information of the bin-picking candidate objects. Edge information and silhouette information of the objects may be extracted from at least one of the binary image and the edge image. Edge information of the object may include, for example, an image or a text printed on the surface of the object. Silhouette of the object may be, for example, entire outline of the object.

The control unit 400 may detect a bin-picking target object from the bin-picking candidate objects based on the extracted features. Detecting a bin-picking target object means detecting an object region where the bin-picking target object is.

The control unit 400 may estimate location and pose of the bin-picking target object included in the detected object region. The control unit 400 may control the bin-picking unit 500 to perform bin-picking for the bin-picking target object based on the estimated location and pose.

When the bin-picking target object is not detected because several bin-picking candidate objects are overlapped with each other, the control unit 400 may control the movement of the supporting unit 210 to change alignment of the objects 10 in the bin-picking box 100.

For example, the control unit 400 may move the supporting unit 210 down and then up to transform shape of the bin-picking box 100. When the supporting unit 210 moves up and down, the objects 10 in the bin-picking box 100 may be rearranged. Thus, locations and poses of the bin-picking candidate objects may be changed to facilitate the detection of the bin-picking target object.

Figure 2A:
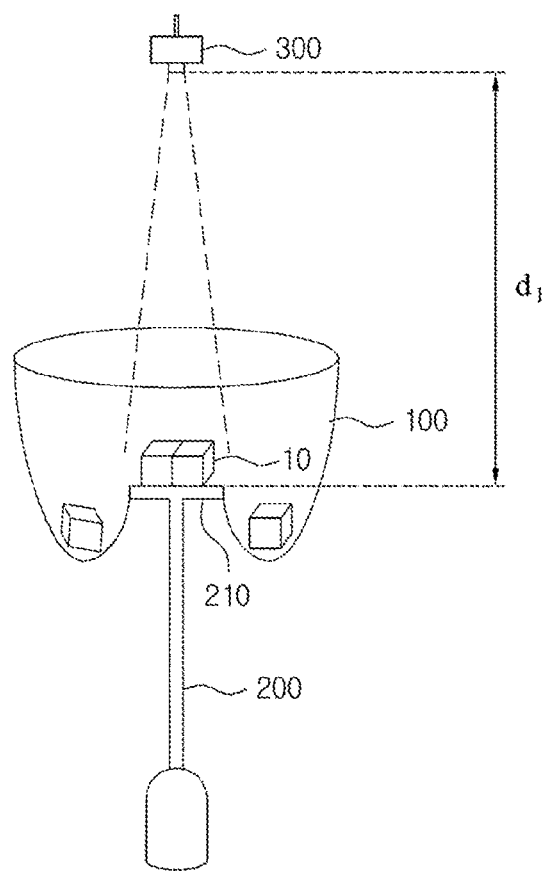
FIG. 2A, FIG. 2B and FIG. 2C are diagrams illustrating examples of rearrangement of objects.
Figure 2B:
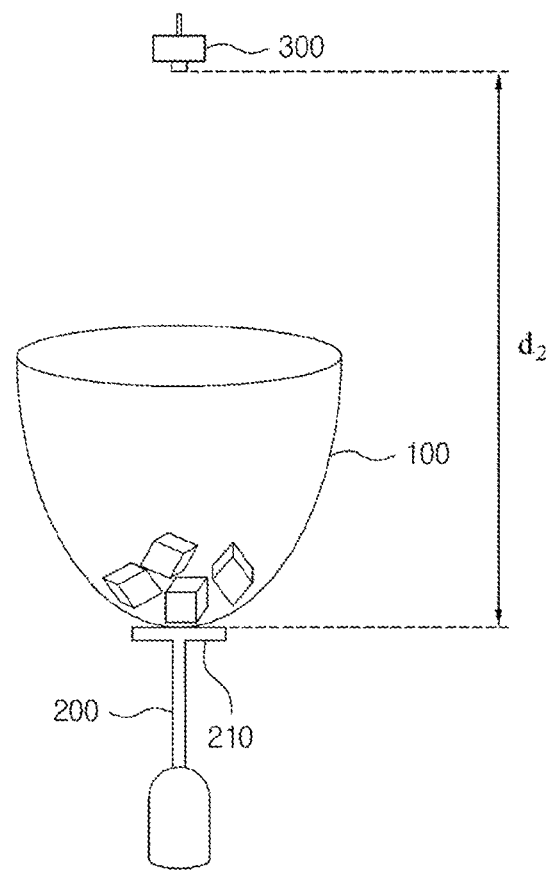
Figure 2C:
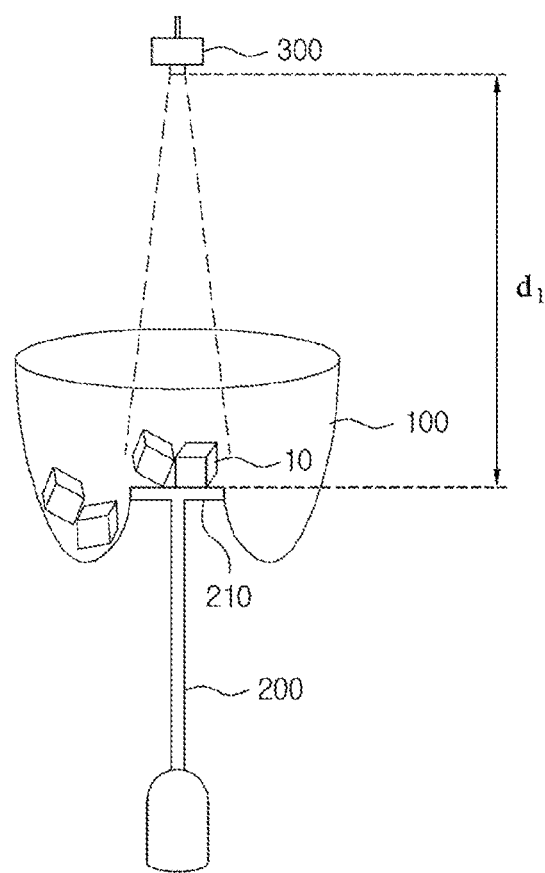

FIG. 2A, FIG. 2B and FIG. 2C are diagrams illustrating examples of rearrangement of objects.

As shown in FIG. 2A, it is assumed that four objects 10 are in the bin-picking box 100 and the bottom of the bin-picking box 100 is supported by the supporting unit 210. When the supporting unit 210 is spaced-apart from the image acquisition unit 300 in a distance of d1, it is also assumed that the supporting unit 210 is at a first location. It is also assumed that bin-picking candidate objects are overlapped with each other so that feature extracting is quite difficult.

The control unit may move the supporting unit 210 down to be spaced-apart from the image acquisition unit 300 in a distance of d2 to transform shape of the bin-picking box 100 as shown in FIG. 2B. Here, when the supporting unit 210 is spaced-apart from the image acquisition unit 300 in a distance of d2, it is assumed that the supporting unit 210 is at a second location. When the bin-picking box is formed of a flexible fabrics material and the supporting unit 210 moves down, the bin-picking box 100 may be drooped down toward the gravity direction to shuffle the objects in the bin-picking box 100.

The control unit may move the supporting unit 210 up to the first location to transform shape of the bin-picking box 100 to rearrange the objects 10 in the bin-picking box 100 as shown in FIG. 2C. Accordingly, locations and poses of the bin-picking candidate objects may be changed. Referring to FIG. 2C, it is noted that locations and poses of the bin-picking candidate objects are changed from the locations and the poses of the bin-picking candidate objects shown in FIG. 2A.

As described with reference to FIG. 2A, FIG. 2B and FIG. 2C, when the supporting unit 210 is spaced-apart from the image acquisition unit 300 in a distance of d1, an image may be taken.

A conventional bin-picking system detects and picks objects in a fixed bin-picking box. The number of objects placed in the bin-picking box becomes less and thus the distance between the object at the top position and a camera to take an image becomes farther which may increase an error when the location of the bin-picking target object is estimated.

Since the image acquisition unit 300 takes an image when the supporting unit 210 is spaced-apart in the distance of d1 therefrom, it may reduce an error when the location of the bin-picking target object is estimated. This may improve accuracy for estimating the distance for the bin-picking target object.

A cross-sectional object region of the bin-picking box 100 may become narrower toward to the bottom. For example, the bin-picking box 100 may be formed in a cone shape having a narrower cross-sectional object region toward the bottom.

Since a conventional bin-picking box is formed in a rectangular shape, objects at the edge cannot be easily detected and picked.

When the cross-sectional object region of the bin-picking box 100 becomes narrower toward to the bottom, detection and picking of the object may be easier. For example, when the supporting unit 210 moved downward, the bin-picking box 100 may be drooped to the gravity direction to place the objects 10 at one place. When the supporting unit 210 moves up again, the bin-picking candidate objects may be located on the supporting unit 210 to facilitate detection and picking of the bin-picking target object.

The supporting unit 210 may be formed to have a narrower cross-sectional object region compared to cross-sectional object region of a top end of the bin-picking box 100 to place some of the objects 10 in the bin-picking box 100 on the supporting unit 210 to increase the accuracy of estimating pose.

Figure 3:
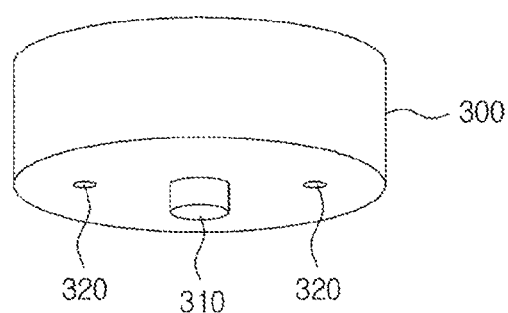
FIG. 3 is a diagram illustrating an example of an image acquisition unit.

FIG. 3 is a diagram illustrating an example of an image acquisition unit.

Referring to FIG. 3, the image acquisition unit may include a visual sensor 310 and a front light 320. The front light 320 can be omitted.

The visual sensor 310 may take an image of the bin-picking candidate objects. The visual sensor 310 may be a 2-dimensional (2D) or 3-dimensional (3D) sensor. The visual sensor 310 may be a high resolution industrial camera to acquire accurate edge and silhouette information of the objects.

The front light 320 may be turned on or off by the control unit or an operator. When the front light 320 irradiates light to the bin-picking candidate objects, edge information of the bin-picking candidate objects may be easily extracted.

The image acquisition unit may be formed to minimize impact from light reflection by surface characteristics of the objects, and lighting irradiated from the front light 320. For example, a polarizing filter may be formed around lens of the visual sensor 310 which is the part where light is incident to the visual sensor 310. Highlights caused by light reflection may be eliminated since the light incident to the visual sensor 310 is filtered. Thus, impact caused from light reflection by surface characteristics of the object may be minimized.

For example, a diffusing panel may be also formed to diffuse light around the front light 320. The diffusing panel may minimize impact to the visual sensor 310 from the light from the front light 320 by diffusing the light from the front light 320.

Figure 4A:
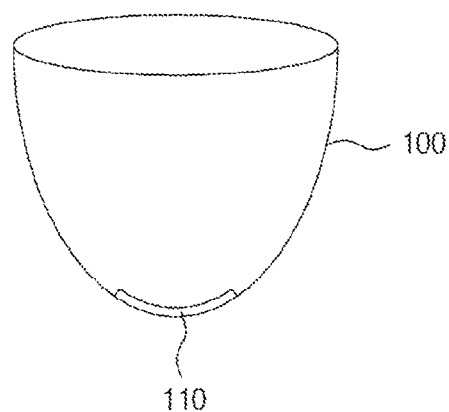
FIG. 4A and FIG. 4B are diagrams illustrating examples of a bin-picking box.
Figure 4B:
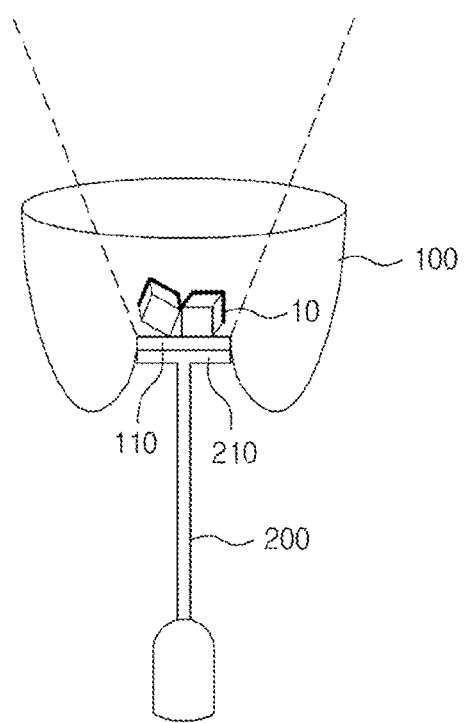

FIG. 4A and FIG. 4B are diagrams illustrating examples of a bin-picking box.

Referring to FIG. 4A, a back light 110 may be formed at the bottom of the bin-picking box 100.

When an object is detected by using a visual sensor, specific surface features of the objects may be detected to estimate location and pose of the object. When the object is covered by a package having characteristics of light reflection or refraction, for example, such as plastic, it may be difficult to detect silhouette and edge information of the object properly.

The back light 110 may be formed to facilitate estimation of location and pose of the object. The back light 110 may be turned on or off by the control unit or an operator.

As shown in FIG. 4B, contour of the bin-picking candidate objects is appeared considerably by light irradiated form the back light 110. Thus, silhouette of the bin-picking candidate objects is extracted more accurately.

The back light 110 may be formed to have a cross-sectional object region similar to that of the supporting unit 210.

FIG. 5 is a flowchart illustrating an example of a bin-picking method. At least one step illustrated in FIG. 5 can be omitted.

In step 501, image of a bin-picking candidate object may be taken when a supporting unit is positioned at a first location. The bin-picking candidate object may be an object in the bin-picking box and placed on the supporting unit. The bin-picking candidate object may be one or more. Photographing may be performed when the front light is turned on.

In step 503, detecting a bin-picking target object from the image may be performed. When the bin-picking target object is detected, it may proceed to a step 505, while it is not detected, it may proceed to a step 511. The bin-picking target object may be an object to be bin-picked from the bin-picking candidate objects. The detecting a bin-picking target object may be explained with reference to FIG. 6 below.

In step 505 when the bin-picking target object is detected, the bin-picking target object may be bin-picked.

On the other hands, in step 511 when the bin-picking target object is not detected, the supporting unit may move down to the second location to transform shape of the bin-picking box to shuffle the objects in the bin-picking box.

In step 513, the supporting unit may move back to the first location to rearrange the objects placed in the bin-picking box. Accordingly, the bin-picking candidate objects on the supporting unit may be also rearranged to change locations and poses of the bin-picking candidate objects.

In step 515, the back light at the bottom in the bin-picking box may be turned on. If the back light is already turned on, the back light may be kept in an on state.

Then, it may proceed to step 501 to repeat the bin-picking process.

Figure 6:
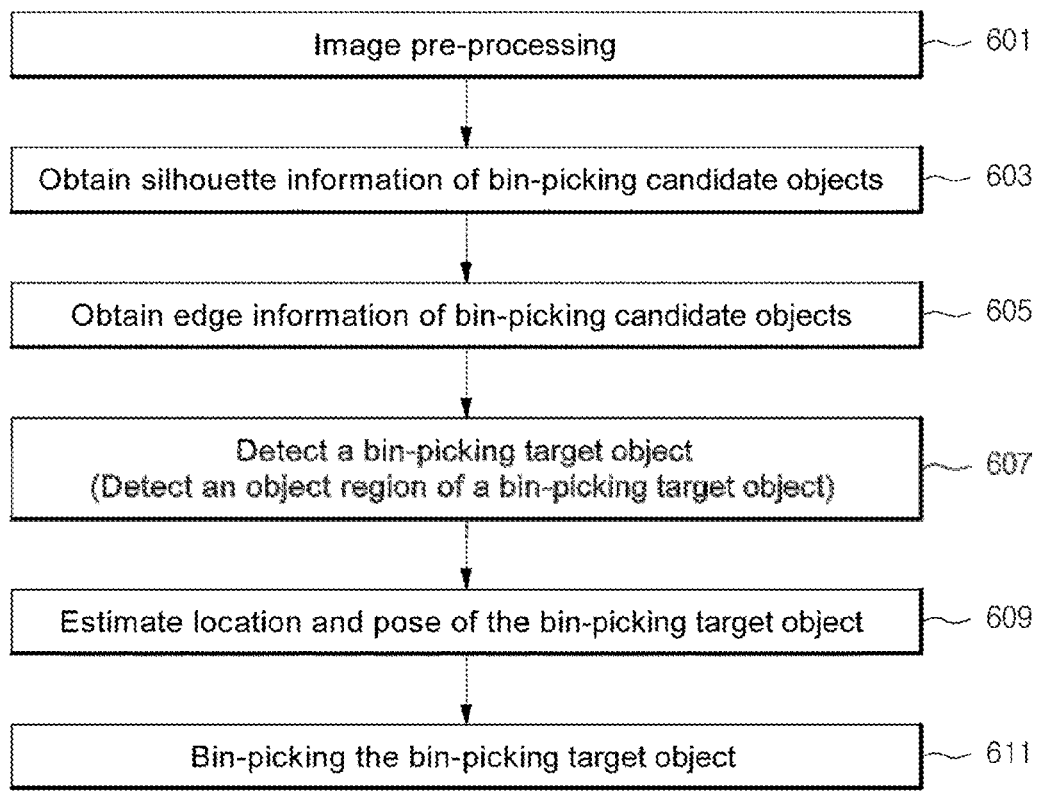
FIG. 6 is a flowchart illustrating an example of a method for detecting a bin-picking target object.

FIG. 6 is a flowchart illustrating an example of a method for detecting a bin-picking target object. A sequence of the steps is not a sequence in which the steps should be performed in the sequence and/or an arbitrary technical step can be omitted.

In step 601, image pre-processing may be performed. The image pre-processing may include, for example, distortion correction and image filtering processes. Binary image may be generated using an adaptive binarization algorithm during the image pre-processing.

In step 603 and step 605, silhouette and edge information of bin-picking candidate objects may be obtained from the image (the pre-processed image). General methods may be used to obtain the silhouette and edge information.

In step 607, a bin-picking target object may be detected. Detecting a bin-picking target object may mean detecting an object region where the bin-picking target object exists. When the bin-picking candidate object is more than two, a bin-picking candidate object with the best silhouette and edge information may be detected as the bin-picking target object.

As described above, the image may be taken when at least one of the front light and the back light is turned on. The image, which is taken when the front light is turned on, may provide better edge information than that taken when the front light is turned off. The image, which is taken when the back light is turned on, may provide better silhouette information than that taken when the back light is turned off. Therefore, the image, which is taken when both the front light and the back light are turned on, may provide better detection for the bin-picking target object.

In step 609, location and pose of the bin-picking target object may be estimated. Location and pose of the bin-picking target object may be estimated using the silhouette and edge information obtained in the previous processes.

According to an example, transformation parameters may be extracted for the bin-picking target object. Location and pose of the bin-picking target object may be estimated based on the extracted transformation parameters. Location of the bin-picking target object may be a 3-dimensional coordinate based on the image acquisition unit or the supporting unit. Pose of the bin-picking target object may be a 3-dimensional rotation angle of the object. Pose of the bin-picking target object may include a rotation angle based on any side of the bin-picking target object.

According to an example, pose of the bin-picking target object may be estimated through machine learning. For example, when images of many bin-picking target objects are continuously taken, feature types (including at least one of silhouette information and edge information) may be classified and stored based on the classification. Thus, when a feature type of the bin-picking target object is recognized, the location and pose stored according to the recognized feature type may be estimated as location and pose of the bin-picking target object which is currently taken.

In step 611, the bin-picking target object may be bin-picked.

The exemplary embodiment of the present disclosure can be implemented by various method. For example, the exemplary embodiment of the present disclosure can be implemented by using hardware, software or its combination. When they are implemented by software, they may be implemented as software executing in more than one processors using various operating systems or platforms. In addition, the software may be created by using any language among various appropriate programming languages or be compiled in machine language codes or intermediate codes executable in a framework or virtual machine.

In addition, when the exemplary embodiment of the present disclosure is executed in more than one processors, the exemplary embodiment of the present disclosure may be implemented by processor readable media such as a memory, a floppy disk, a hard disk, a compact disk (CD), an optical disk or a magnetic tape, or the like in which more than one programs are recorded to conduct the implementation of various exemplary embodiments of the present disclosure.

What is claimed is:
1. A bin-picking system comprising:
a transformable bin-picking box;
a bin-picking unit configured to pick up a bin-picking target object from randomly arranged objects in the bin-picking box;

a supporting unit configured to support a bottom part of the bin-picking box and be movable upward and downward;

a control unit configured to detect features of bin-picking candidate objects, determine the bin-picking target object based on the features of bin-picking candidate objects and control the bin-picking unit;

wherein the bin-picking candidate objects are inside the bin-picking box and placed randomly on the supporting unit, where the bin-picking target object is an object selected from the bin-picking candidate objects, wherein when the bin-picking target object is not determined by the control unit, the control unit changes an alignment randomly of the bin-picking candidate objects by transforming the bin-picking box by controlling a movement of the supporting unit to select the bin-picking target object, and wherein the supporting unit distorts the bottom part of the bin-picking box by a movement, when the control unit changes the alignment randomly of the bin-picking candidate objects.

2. The bin-picking system of claim 1, wherein the bin-picking box is formed of a flexible material.

3. The bin-picking system of claim 1, wherein the bin-picking box comprises a back light configured to irradiate light to the bin-picking candidate objects.

4. The bin-picking system of claim 1, wherein a cross-sectional object region of the bin-picking box becomes narrower toward the bottom end.

5. The bin-picking system of claim 1, wherein a cross-sectional object region of the supporting unit is narrower than that of the top end of the bin-picking box.

6. The bin-picking system of claim 1, further comprising an image acquisition unit configured to take an image of the bin-picking candidate objects, wherein the control unit detects the bin-picking target object from the image received from the image acquisition unit.

7. The bin-picking system of claim 6, wherein the control unit extracts silhouette and edge information of the bin-picking candidate objects from the image received from the image acquisition unit and detects the bin-picking target object from the bin-picking candidate objects based on the extracted silhouette and edge information.

8. The bin-picking system of claim 7, wherein the control unit estimates location and pose of the bin-picking target object based on the extracted silhouette and edge information.

9. The bin-picking system of claim 8, wherein the bin-picking unit performs bin-picking for the bin-picking target object based on the estimated location and pose.

10. The bin-picking system of claim 6, wherein the control unit moves the supporting unit down from a first location to a second location and then moves up the supporting unit from the second location to the first location when the bin-picking target object is not detected from the bin-picking candidate objects.

11. The bin-picking system of claim 10, wherein the control unit controls the image acquisition unit to take an image when the supporting unit is positioned at the first location.

12. The bin-picking system of claim 6, wherein the image acquisition unit comprises:

a visual sensor configured to take a photo of the bin-picking candidate objects; and a front light configured to irradiate light to the bin-picking candidate objects.

13. The bin-picking system of claim 12, wherein the image acquisition unit further comprises at least one of:

a polarizing filter configured to filter the light incident to the visual sensor; and a diffusing panel configured to diffuse the light irradiated from the front light.

* * * * *